United States Patent
Meyer-Güldner et al.

[11] Patent Number: 6,022,151
[45] Date of Patent: Feb. 8, 2000

[54] OPTICAL MODULE

[75] Inventors: Frank Meyer-Güldner; Oliver Ölze, both of Berlin; Andreas Steffensen, Kleinmachnow, all of Germany

[73] Assignee: Siemens Aktiengesellschaft, Munich, Germany

[21] Appl. No.: 09/281,100

[22] Filed: Mar. 29, 1999

Related U.S. Application Data

[63] Continuation of application No. PCT/DE97/02276, Sep. 26, 1997.

[30] Foreign Application Priority Data

Sep. 27, 1996 [DE] Germany ............... 196 41 512

[51] Int. Cl.⁷ .................................................. G02B 6/36
[52] U.S. Cl. ................................................. 385/92; 385/88
[58] Field of Search ........................... 385/88–92, 94, 385/66, 78, 84, 139, 49, 52

[56] References Cited

U.S. PATENT DOCUMENTS

| | | | |
|---|---|---|---|
| 5,042,891 | 8/1991 | Mulholland et al. | 385/93 |
| 5,082,344 | 1/1992 | Mulholland et al. | 385/60 |
| 5,127,073 | 6/1992 | Mulholland et al. | 385/92 |
| 5,546,490 | 8/1996 | Kikuchi et al. | 385/93 |
| 5,937,121 | 8/1999 | Ott et al. | 385/59 |

FOREIGN PATENT DOCUMENTS

| | | |
|---|---|---|
| 0503380A2 | 3/1991 | European Pat. Off. . |
| 0709699A2 | 5/1996 | European Pat. Off. . |
| 195 15 795A1 | 11/1995 | Germany . |

OTHER PUBLICATIONS

"Spring Retainer for Retention of Cable Connector", IBM Technical Disclosure Bulletin, vol. 20, No. 5, Oct. 1977.
"GBaud Transceiver", Product Information Ref. No. A23001–G40–P056–X–7600, Siemens, pp. 1–12, Apr. 1994.

*Primary Examiner*—Hemang Sanghavi
*Attorney, Agent, or Firm*—Herbert L. Lerner; Laurence A. Greenberg

[57] ABSTRACT

An optical module includes a holding body for an optical component. The holding body is accommodated in a housing and provided with a flange. A plastic U-shaped latching device is held on the holding body and includes a base part having tongues with catches. In order to provide the module with a high reverse bending strength with reference to the tongues, the latching device is held on the flange with the aid of nose-like attachments of the housing in a transition region between the respective tongue and the base part.

7 Claims, 1 Drawing Sheet

1

OPTICAL MODULE

CROSS-REFERENCE TO RELATED APPLICATION

This application is a continuation of copending International Application No. PCT/DE97/02276, filed Sep. 26, 1997, which designated the United States.

BACKGROUND OF THE INVENTION

FIELD OF THE INVENTION

The invention relates to an optical module including a cylindrical holding body for an optical component, the holding body accommodated in a housing and provided with a flange, and a U-shaped latching device having a base part (provided with a through-opening for the holding body) pushed onto the holding body and held on the flange by inner projections of the housing overlapping a side of the base part facing away from the flange, the latching device having two mutually opposite tongues with catches at their ends.

A known module of that type has been in prior public use in the form of the Siemens "GBaud Transceiver" and is shown in Siemens Product Information Ref. No. A23001-G40-P056-X-7600. A further such module is described in German Published, Non-Prosecuted Patent Application DE 195 15 795 A1, corresponding to U.S. Pat. No. 5,546,490. In the case of those known modules, a plastic U-shaped latching device is fastened on a cylindrical holding body having a flange for an optical fiber. The latching device has a base part with a through-opening for the holding body. The base part is pushed onto the holding body and fastened on the flange of the holding body with the aid of internal projections, by virtue of the fact that the projections of the housing press the base part against the flange in the mounted state of the module. The base part can be extended beyond the width of the tongues for that purpose, with the result that the projections of the housing lie over the entire length of the base part against lateral extensions thereof. The known latching device furthermore has two tongues which are provided in a manner axially parallel with the holding body. The two tongues are situated diametrically with reference to the holding body, they each extend from the base part, and they each have a catch at their end.

According to German Published, Non-Prosecuted Patent Application DE 195 15 795 A1, corresponding to U.S. Pat. No. 5,546,490, guiding regions of the housing are provided with undercuts, near the housing bottom. Engaging regions have a spacing which can be reduced elastically during the mounting operation. Those regions engage in a captive manner behind the undercuts.

SUMMARY OF THE INVENTION

It is accordingly an object of the invention to provide an optical module, which overcomes the hereinafore-mentioned disadvantages of the heretofore-known devices of this general type and which is configured with respect to its plastic U-shaped latching device in such a way that it has a high reverse bending strength with regard to its tongues.

With the foregoing and other objects in view there is provided, in accordance with the invention, an optical module, comprising a housing having inner projections in the form of nose-like attachments; a cylindrical holding body for an optical component, the holding body accommodated in the housing and having a flange; and a U-shaped latching device having a base part with a through-opening formed therein pushed onto the holding body and defining a side of the base part facing away from the flange, the latching device held on the flange by the inner projections overlapping the side of the base part facing away from the flange, the latching device including two mutually opposite tongues having ends with catches, and the latching device including transition regions between the tongues and the base part; the nose-like attachments overlapping the base part between the two tongues in the transition region.

A substantial advantage of the module according to the invention is that with regard to its latching device it has a relatively high reverse bending strength with reference to the tongues. This is because regions of the base part are also deflected when the tongues are deflected by virtue of the fact that the latching device is held with the aid of the nose-like attachments in corner regions between the tongue and base part in each case. That renders the stressing and/or expansion of the material of the latching device relatively slight. The material is stressed relatively little as a result.

In the module according to the invention, the base part of the latching device can be constructed in such a way that it is flat, that is to say it lies against the flange of the holding body over its entire surface. The fact that the latching device is held with the aid of the nose-like attachments also ensures that the base part supports the deflection of the tongues in such a construction. It is, however, regarded as more advantageous if, with regard to its thickness, the base part bulges out from the tongues, at least on its side facing the flange. The convex structure of the base part lengthens the regions of the latching device participating in the bending of the tongues into the base part, thus producing a further substantial reduction in the expansion of the material in the deflected state of the tongues.

The module according to the invention can therefore readily come into contact with alcohols and ketones, which are used as customary cleaning agents after the assembly of printed circuit boards, when in a state mounted on printed circuit boards. This occurs without the stressing of the plastic of the latching device caused thereby leading to a reverse bending strength which is not acceptably small.

With the objects of the invention in view there is also provided an optical module, comprising a housing having inner projections; a cylindrical holding body for an optical component, the holding body accommodated in the housing and having a flange; and a U-shaped latching device having a base part with a through-opening formed therein pushed onto the holding body and defining a side of the base part facing away from the flange, at least the side of the base part facing away from the flange bulging out toward the middle, the latching device held on the flange by the inner projections overlapping the side of the base part facing away from the flange, and the latching device including two mutually opposite tongues having ends with catches.

An achievement of this embodiment of the module according to the invention, which occurs independently of the configuration of the projections on the housing, is that the regions of the latching device which participate in the bending of the tongues are extended into the base part. That leads to a relatively low stressing of the material of the latching device, accompanied by the additional advantages already set forth above.

In accordance with another feature of the invention, the cross sections of each of the tongues of the latching device increase continuously from the catch to the base part, and the cross section of the base part increases from the tongues to the middle. In this way, the above-mentioned advantages of the module according to the invention are further strengthened in all of the embodiments treated above.

In accordance with a concomitant feature of the invention, in order to be able to mount the latching device of the module according to the invention as simply as possible, the base part is provided with pinch ribs, in the vicinity of the through-opening, for prefixing outside on the holding body.

Other features which are considered as characteristic for the invention are set forth in the appended claims.

Although the invention is illustrated and described herein as embodied in an optical module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
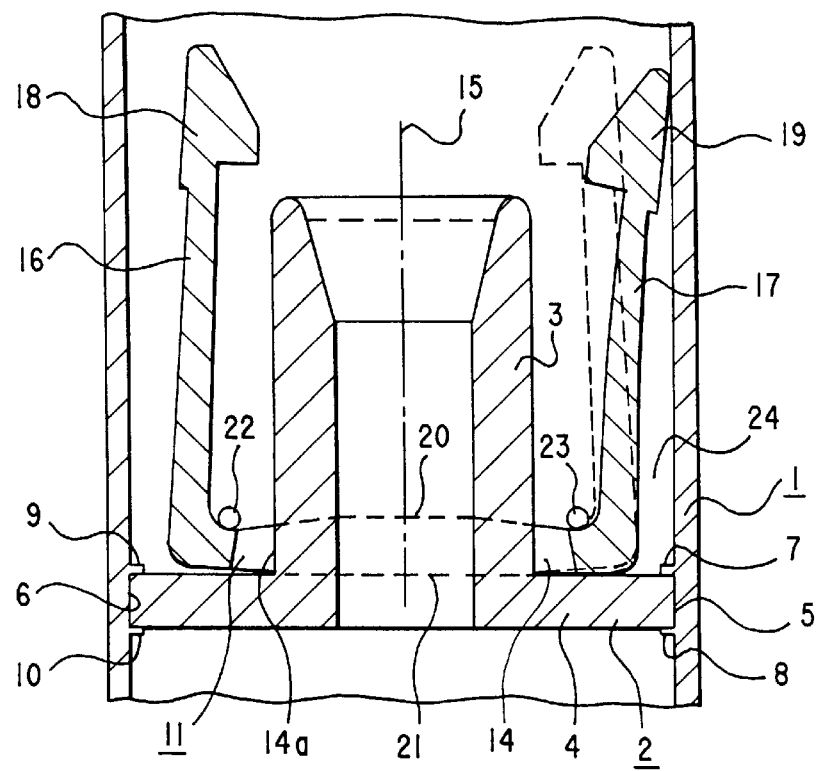
FIG. 1 is a fragmentary, diagrammatic, sectional view through a part of an exemplary embodiment of a module according to the invention, with a latching device.

Referring now to the figures of the drawings in detail and first, particularly, to FIG. 1 thereof, there is seen a cylindrical holding body 2 for a non-illustrated optical fiber which is accommodated in a partly-represented housing 1 of an optical module. The holding body 2 has a flange 4 and a socket-like attachment 3 for holding the optical fiber. The holding body 2 is inserted from above, with reference to FIG. 1, with the flange 4 entering into a slot 5 and into a further slot 6 in the housing 1. The slots 5 and 6 are formed by respective longitudinal attachments 7, 8 and 9, 10 on inner wall surfaces of the housing 1. To be precise, the housing 1 is open in a plane above that of the drawing during mounting and can be sealed later by a non-illustrated cover.

Figure 2:
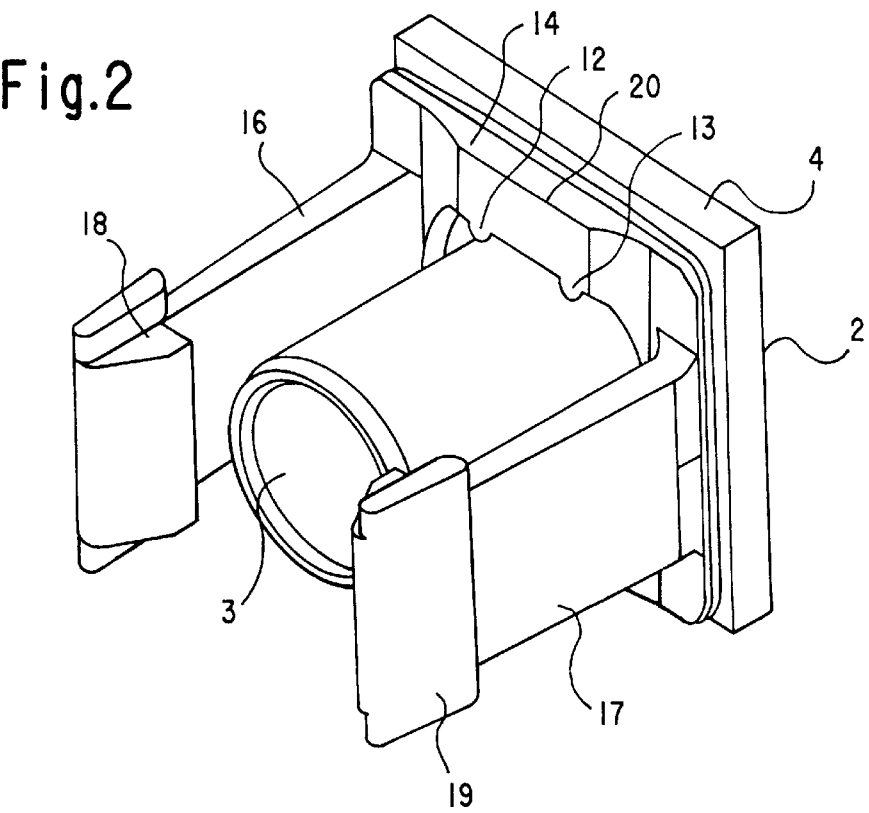
FIG. 2 is a perspective view of only the latching device and a holding body of the exemplary embodiment according to FIG. 1.

A latching device 11 is pushed onto the cylindrical attachment 3 of the holding body 2 and guided against the flange 4 of the holding body 2. Pinch ribs are used to prefix the latching device 11 in this position. FIG. 2 shows only pinch ribs 12 and 13.

FIGS. 1 and 2 furthermore show in detail that the latching device 11 contains a base part 14 having a through-opening 14*a* for the socket-like attachment 3. Tongues 16 and 17 extend from the base part 14 parallel to an axis 15 of the holding body 3. Each of the tongues 16, 17 bears a respective catch 18, 19 which can be brought to engage with a counterpart of the optical module, for example an optical plug, in a non-illustrated manner.

As FIGS. 1 and 2 further show, the base part 14 of the latching device 11 is constructed in such a way that its thickness increases from the tongues 16 and 17 toward the middle in the direction of its two sides 20 and 21. The latching device 11 is held on the holding body 2 by nose-like attachments 22 and 23 which overlap the side 20 of the base part 14 that faces away from the flange 4, in a transition region between the tongues 16 and 17 and the base part 14.

These attachments 22 and 23, which are preferably constructed as narrow lugs or pins, are provided on the bottom 24 of the housing 1. Corresponding further nose-like attachments are present on the non-illustrated cover of the housing 1. The cover is fitted onto the housing 1 from above after mounting of the holding body 2 with the latching device 11. The base part 14 therefore acts as an additional bending element, by virtue of the fact that it can be freely deflected in the region between the nose-like attachments 22 and 23, and that its cross-sectional surface and cross-sectional height increase in a manner suitable to the type of bending stress starting from the tongues 16 and 17 up to the middle of the base part 14. In this case, the result of the outward bulging on the lower side 21 of the base part 14 in FIG. 1 is that despite the fact that the latching device 11 is held on the holding body 2 with little play, there is mobility which favors the bending.

As FIG. 1 shows in particular, when the tongues 16 and 17 bend outward from a basic position aligned essentially parallel to the axis 15 of the holding body 2, not only are the tongues 16 and 17 bent, but the bordering regions of the base part 11 are bent too, as may be seen from the dashed and dotted representation in the right-hand lower part of the base part 11 according to FIG. 1. As a result, the material stress as a whole is reduced to a value which is not critical.

We claim:

1. An optical module, comprising:

a housing having inner projections in the form of nose-like attachments;

a cylindrical holding body for an optical component, said holding body accommodated in said housing and having a flange; and a U-shaped latching device having a base part with a through-opening formed therein pushed onto said holding body and defining a side of said base part facing away from said flange, said latching device held on said flange by said inner projections overlapping said side of said base part facing away from said flange, said latching device including two mutually opposite tongues having ends with catches, and said latching device including transition regions between said tongues and said base part;

said nose-like attachments overlapping said base part between said two tongues in said transition region.

2. The module according to claim 1, wherein at least said side of said base part facing away from said flange bulges out toward the middle.

3. The module according to claim 1, wherein said tongues have a cross section increasing continuously from each of said catches to said base part, and said base part has a cross section increasing continuously from each of said tongues to the middle of said base part.

4. The module according to claim 1, wherein said base part has pinch ribs in the vicinity of said through-opening for outer prefixing on said holding body.

5. An optical module, comprising:

a housing having inner projections;

a cylindrical holding body for an optical component, said holding body accommodated in said housing and having a flange; and a U-shaped latching device having a base part with a through-opening formed therein pushed onto said holding body and defining a side of said base part facing away from said flange, at least said side of said base part facing away from said flange bulging out toward the middle, said latching device held on said flange by said inner projections overlapping said side of said base part facing away from said flange, and said latching device including two mutually opposite tongues having ends with catches.

6. The module according to claim 5, wherein said tongues have a cross section increasing continuously from each of said catches to said base part, and said base part has a cross section increasing continuously from each of said tongues to the middle of said base part.

7. The module according to claim 5, wherein said base part has pinch ribs in the vicinity of said through-opening for outer prefixing on said holding body.

* * * * *